Oct. 23, 1923.
J. Q. ADAMS
1,471,471
DEVICE FOR FACING AUTOMOBILE VALVE SEATS AND THE LIKE
Filed March 18, 1920
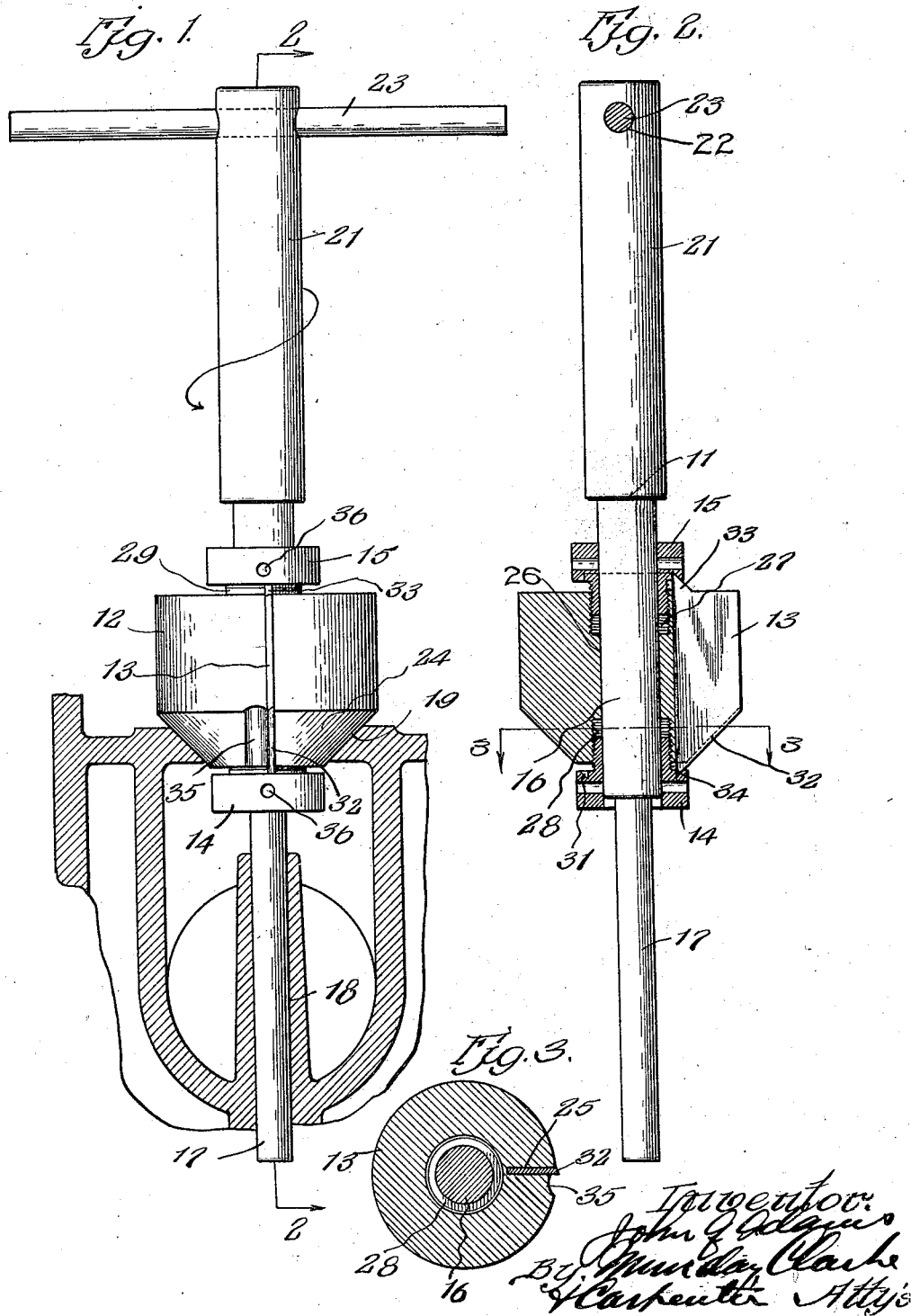

Patented Oct. 23, 1923.

1,471,471

UNITED STATES PATENT OFFICE.

JOHN Q. ADAMS, OF MUSKEGON, MICHIGAN.

DEVICE FOR FACING AUTOMOBILE VALVE SEATS AND THE LIKE.

Application filed March 18, 1920. Serial No. 366,780.

*To all whom it may concern:*

Be it known that I, JOHN Q. ADAMS, a citizen of the United States, residing in Muskegon, in the county of Muskegon and State of Michigan, have invented a new and useful Improvement in Devices for Facing Automobile Valve Seats and the like, of which the following is a specification.

This invention relates in general to valve facing implements, and has more particular reference to the provision of an implement for facing the valve seat of an automobile engine.

A principal object of my present invention is the provision of an effective hand tool, which will accurately cut the carbon from the valve seat and otherwise grind it under moderate pressure exerted by the hand of the operator. It has generally been the custom, prior to my invention, to provide an implement having a considerable number of bevelled cutting edges arranged in frusto-conical formation for engagment of the valve seat. The pressure exerted upon the implement was, of course, divided among the several teeth and in order that they might cut considerable pressure was necessary.

My invention contemplates the material reduction of the number of these teeth, preferably to a single tooth, so that all of the pressure is concentrated at a single cutting or facing edge, means, of course, being provided to hold this edge in proper desired relation with the seat being operated upon.

Another and highly important object of the invention is the provision of a tool for facing automobile valve seats and the like, the facing or cutting means of which may be continuously resharpened or ground without preventing the accurate presentation of the cutting edge part or parts to the surface being operated upon.

Another improtant object of the invention is the provision of an implement of the character described that will permit of adjustment of the cutting means in the head or body and in which this cutting means may consist of one or more blades of tool steel set in a carrying head.

Numerous other objects and advantages of the invention will be apparent as it is better understood from the following description, which taken in connection with the accompanying drawings discloses a preferred embodiment thereof.

On the drawing,

Figure 1 is a side elevation of an implement embodying my present invention, an automobile valve seat and adjacent parts being shown in section;

Fig. 2 is a section on the line 2—2 of Fig. 1 and through the body of the implement; and Fig. 3 is a section on the line 3—3 of Fig. 2.

The facing device or implement shown on the drawing and embodying my present invention, consists of a stem 11 on which is mounted a body or head 12 carrying a single cutter 13 adjustably held in position in said body by front and back collars 14 and 15.

The stem 11 comprises a central body receiving part 16 of slightly tapering form, on which the head 12 is mounted, and a lower guiding part 17 adapted for insertion in the guide 18 provided beneath the valve seat 19 for receiving and guiding the stem of the valve. An upper part 21 of the stem is provided at its top with an aperture 22 through which may be positioned a rod 23 to be grasped by the hand to turn the implement in its seat facing action.

The head or body 12 is cylindrical throughout the greater portion of its length and is provided at its lower end with a tapered or frusto-conical part 24, this part having preferably the same tapering of the valve seat for which it is intended, which taper is usually approximately 45°. At one side of the central axis a slot 25 is provided to receive the cutting element 13 and this slot extends from a point well within the head to its outer face and from end to end. The forward side of the slot in the direction of movement of the head in facing is arranged radially of the implement. The head is provided with a central opening 26 tapered in accordance with the taper of the part 16 of the stem to permit the stem to be wedged in place and maintain tight frictional engagement between the head and stem during operation and at the same time permitting the removal of the head by a mere tapping of the lower end of the stem. At each end the head is recessed as indicated at 27 and 28, and these recesses are provided with oppositely extending threads.

The collars 14 and 15 are provided with threaded shanks 29 adapted to be screwed into the recesses 27 and 28 and form enlarged circular heads for said shanks. The annular faces of the collars adjacent the threaded shanks are provided with circular recesses 31 to receive the ends of the cutting element.

This cutting element consists of a blade having a bevelled face or end 32 upon the same angle as the face 19 of the body or head. It is of a depth or width substantially that of the recess 25 and of a length equal to or slightly longer than the length of the head. At the upper end a beveled spur 33 extends out. This spur is adapted to engage in the recess 31 of the rear collar 15 and the point 34 at the front in a similar recess in the collar 14. The direction of turning is indicated by the arrow in Fig. 1. The threads of both the collars and the body are such that facing action by the implement in the direction shown tends to tighten the collars rather than unscrew them. That is to say, the lower collar is held in place with right-hand threads and the other with left-hand.

The arrangement of the slot 25 is such that the radially disposed face of it is the forward face in the direction of movement and in front of this face I cut away slightly the material of the bevelled part 19 of the body as indicated at 35. I also provide recesses 36 in the collars for engagement by a spanner to loosen and tighten them.

It will be manifest that the collars and their threaded engagement with the head permit lengthwise adjustment of the cutting blade 13 and it is intended that this blade shall protrude a minute mount and be disposed as nearly as is practicable in the plane of the bevelled part 19 of the head. The blade member 13 may be made from any suitable tool steel material and, of course, the material of the head and other parts need not be of as hard a quality.

The bevelled part 19 and the engagement with the lower end of the stem in the guide 18 acts to confine the cutting blade to accurate cutting position and it will be manifest that all of the pressure exerted upon the tool is concentrated at the single cutting edge. It will also be apparent that this cutting edge may be renewed by grinding or filing or otherwise and upon readjustment be presented in exactly the desired position.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A device for facing automobile valve seats and the like, comprising a body, cutting means carried thereby, and adjusting means for moving said cutting means lengthwise of the body and comprising members disposed on opposite sides of said valve seat when said facing device is in grinding position.

2. A device for facing automobile valve seats and the like, comprising a member having a tapered face for fitting the valve, and a slot extending lengthwise of the head, a cutting element mounted in said slot and screw collars for engaging in said head, said collars having undercut portions for holding opposite ends of said cutting member.

JOHN Q. ADAMS.